No. 750,797. PATENTED FEB. 2, 1904.
W. BIDWELL.
HOG HOLDING IMPLEMENT.
APPLICATION FILED APR. 24, 1903.
NO MODEL.
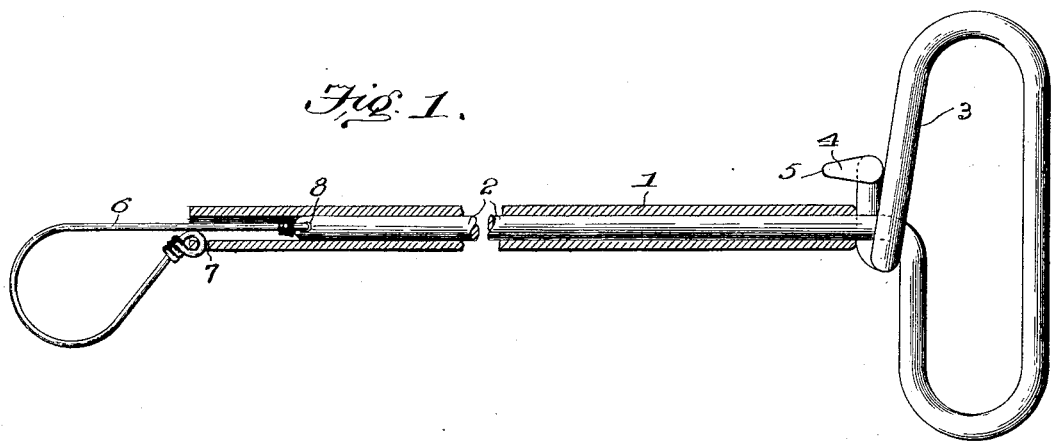
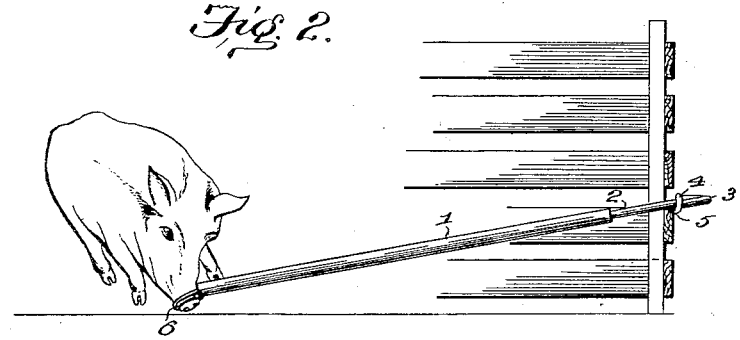
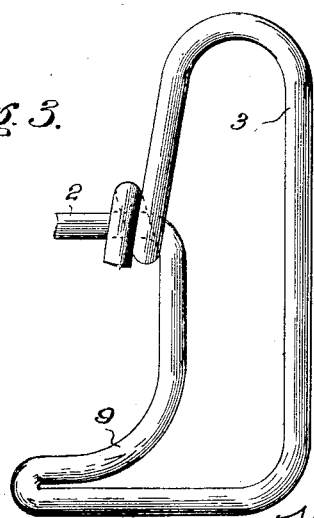
Witnesses
G. Howard Walmsley
Irvine Miller
Inventor
Walter Bidwell,
H. A. Toulmin,
Attorney No. 750,797.　　　　　　　　　　　　　　　　　　　　　Patented February 2, 1904.

UNITED STATES PATENT OFFICE.

WALTER BIDWELL, OF PLAIN CITY, OHIO.

HOG-HOLDING IMPLEMENT.

SPECIFICATION forming part of Letters Patent No. 750,797, dated February 2, 1904.

Application filed April 24, 1903. Serial No. 154,071. (No model.)

*To all whom it may concern:*

Be it known that I, WALTER BIDWELL, a citizen of the United States, residing at Plain City, in the county of Madison and State of Ohio, have invented certain new and useful Improvements in Hog-Holding Implements, of which the following is a specification, reference being had therein to the accompanying drawings.

This invention relates to hog-holding implements, and has for its object to provide a simple and efficient implement whereby a hog may be held by the snout during the operation of passing a ring through the same, the structure being more particularly devised for the purpose of enabling the entire operation of holding and ringing to be performed by one man.

To these ends my invention consists in certain novel features which I will now proceed to describe and will then particularly point out in the claims.

In the accompanying drawings, Figure 1 is a view, partly in elevation and partly in longitudinal section, of an implement embodying my invention in one form. Fig. 2 is a view illustrating its application in use, and Fig. 3 is a detail view showing a modification.

In the preferred form of implement shown in Figs. 1 and 2 the same consists of a tubular body 1, within which fits so as to slide longitudinally therein with a relatively tight fit a rod 2. This rod is provided at one end with a handle 3 and a sharp projection or hook-like point 4. The handle and projection are preferably formed in one piece with the rod by bending the end thereof into a loop-like form to form the hand-grasp, the extremity of the rod being then bent around the end of the straight portion and then in a position at right angles to the plane of the loop forming the handle, the sharpened tip or point of the hook being extended at right angles to the last-mentioned portion and in the direction of the body of the rod, as indicated at 5.

6 indicates a flexible loop, preferably of soft copper wire, having one end fastened to the end of the tube 1 farthest from the handle 3, while its other end is fastened to the end of the rod 2 farthest from the handle 3. These connections of the loop 6 are preferably effected in the manner shown by forming an aperture 7 in the wall of the tube near its end and a similar aperture 8 in the rod 2 near its end, the ends of the loop being passed through said apertures and twisted around the adjacent portions of the body of the loop, as shown.

It will be observed that the rod is capable of sliding freely within the tube, no locking devices being employed to secure the two relatively to each other, and thus interfere with their freedom of movement. It will also be noted that the rod fits within the tube with sufficient tightness to tend to bind within the same when the pull is eccentric or not in the axial line of the parts. Bearing this in mind, the operation is as follows: The rod is pushed into the tube far enough to make the loop of sufficient size to pass easily over the snout of the animal. After the loop has thus been passed over the snout the tube is held with one hand by the operator and the rod pulled out by the other hand, so as to cause the loop to bind tightly around the snout of the animal. The implement is then placed, with the handle end resting on top of one of the boards of the pen or fence, in such a position that the projection 4 extends downward, and the point 5 engages with the vertical surface of the board, as shown in Fig. 2. The animal will attempt to free himself by pulling backward as long as his snout is thus held, and will consequently keep the hooked projection of the rod firmly engaged with the board, and this will keep the loop 6 tight around his snout, since the tube 1 is free to move along the rod, and the harder the animal pulls the tighter the loop will be drawn.

It will thus be seen that one man can perform the entire operation of ringing the hog, for the reason that after engaging the implement with the fence or pen in the manner just described he can let go of it and use both hands for the ringing operation, the hog in the meantime holding himself fast by his own pulling.

Obviously various modifications in the details of the construction may be made without departing from the principle of my invention.

For instance, although I prefer the hook construction shown in Figs. 1 and 2 as a means for engaging the rod with a fixed object, such as the fence or pen, other means to that end may be provided, and in Fig. 3 I have shown the handle so modified, as shown at 9, as to adapt the body of the handle itself for engagement with the fence or pen. I therefore do not wish to be understood as limiting myself strictly to the precise details of construction hereinbefore described, and shown in the accompanying drawings.

Having thus fully described my invention, what I claim as new, and desire to secure by Letters Patent, is—

1. A hog-holding implement comprising a tubular body, a rod fitting and free to slide longitudinally therein, and a flexible loop having its ends connected respectively to the adjacent ends of the tube and rod, the rod being provided at its opposite end with a handle, and with means for engaging the same with a fixed object, such as a board of a pen or fence, substantially as described.

2. A hog-holding implement comprising a tubular body, a rod fitting and free to slide longitudinally therein, and a flexible loop having its ends respectively connected to the adjacent ends of the tube and rod, the rod being provided at its opposite end with a handle and with means located eccentrically relatively to the axial line of the implement for engagement with a fixed object, such as a board of a pen or fence, substantially as described.

3. A hog-holding implement comprising a tubular body, a rod fitting and free to slide longitudinally therein, and a flexible loop having its ends respectively connected to the adjacent ends of the tube and rod, the opposite end of the rod being provided with a handle and with a sharp hook-like projection extending laterally therefrom and adapted to engage a fixed object, such as a board of a pen or fence, substantially as described.

In testimony whereof I affix my signature in presence of two witnesses.

WALTER BIDWELL.

Witnesses:
AL. H. KUNKLE,
WILL O'LAUGHLIN.